Sept. 9, 1958     H. G. ANDRÉ     2,851,512
ELECTRODE ASSEMBLY FOR ELECTRIC BATTERIES
Filed May 16, 1955
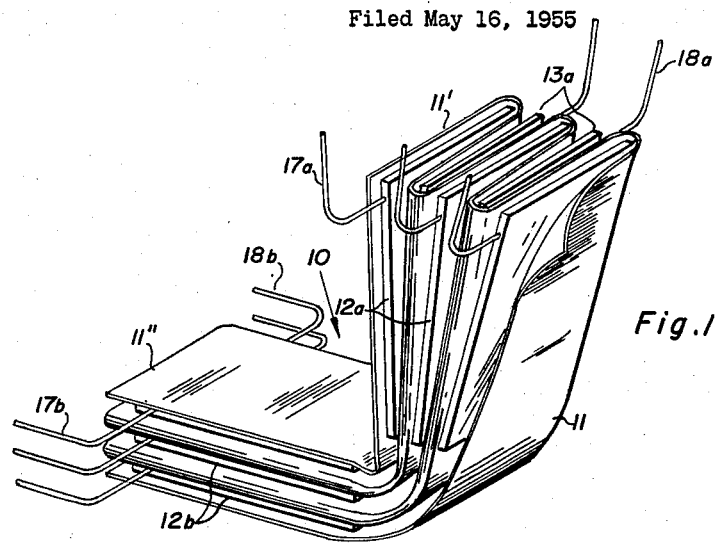
Fig.1
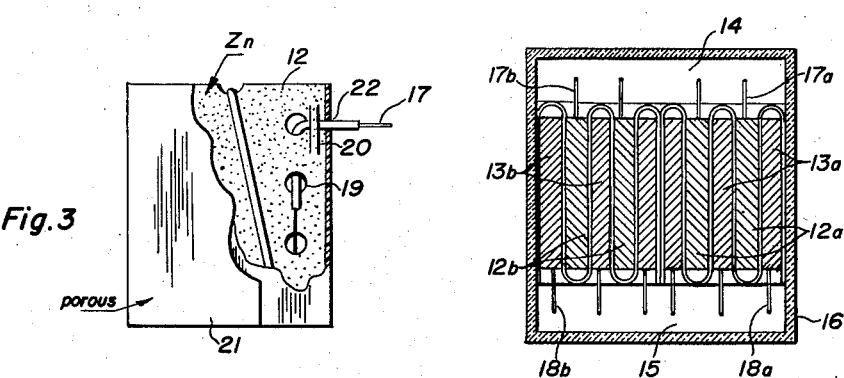
Fig.3
Fig.2
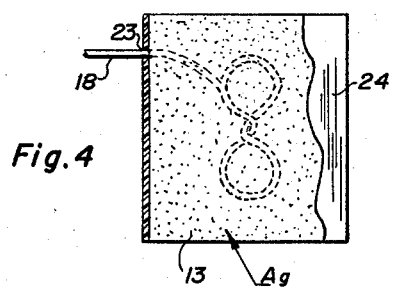
Fig.4
HENRI G. ANDRÉ
INVENTOR.
BY
AGENT

United States Patent Office

2,851,512
Patented Sept. 9, 1958

2,851,512

ELECTRODE ASSEMBLY FOR ELECTRIC BATTERIES

Henri Georges André, Montmorency, France, assignor to Yardney International Corp., New York, N. Y., a corporation of New York Application May 16, 1955, Serial No. 508,497

9 Claims. (Cl. 136—147)

My present invention relates to separators for electric batteries, particularly (but not exclusively) to semi-permeable separators (e. g. of cellophane or of polyvinyl alcohol) designed to be interposed between the positive and negative electrodes of a silver-zinc alkaline battery.

It has been found desirable to dispose a separator member, which may comprise one or more layers of permeable and/or semi-permeable sheet material, in such manner as to subdivide the interior of a battery casing into a positive and a negative electrode compartment as disclosed in copending application Ser. No. 356,200, filed May 20, 1953, in the name of J. J. Bikerman and owned by the assignee of the present application. By this means it is possible, as likewise noted in said co-pending application, to leave at least an edge portion of each electrode plate in direct contact with the electrolyte in a respective compartment, thereby improving the irrigation of the electrodes beyond that obtainable with more conventional arrangements in which the electrodes of either or both polarities are wrapped in separator material either individually or in pairs.

An advantageous way of accomplishing the above result, in accordance with the teaching of said co-pending application, resides in accordion-pleating a separator member so as to provide a series of folds or pockets in which the positive and negative electrodes are alternately placed. One difficulty experienced with this arrangement, however, resides in the fact that the pockets are open at the bottom, whereby it becomes more difficult to hold the electrode material in place than in the case of, for example, a U-shaped envelope of the type disclosed in my prior U. S. Patent No. 2,594,710, issued April 29, 1952.

The general object of my invention is to provide a new type of separator arrangement combining the advantages of a U-shaped envelope according to my aforementioned patent with those of an accordion-pleated wrapper of the type disclosed in the Bikerman application referred to.

In accordance with my present invention, a separator member as hereinabove defined is given a width substantially greater than the height of the electrode plates to be wrapped therein, preferably a width in excess of double said height. After this member has been folded into accordion pleats, the portion thereof projecting beyond the lower edges of the electrode plates is bent over and upward so as to close the bottom of each electrode pocket formed by the accordion pleats. If the height of this projecting equals or exceeds that of the electrode plates, another set of pockets is provided in which additional positive and negative electrodes may be alternately positioned.

The invention will be more fully described with reference to the accompanying drawing in which:

Fig. 1 is a perspective view of an electrode assembly incorporating a separator arrangement according to the invention, shown in the process of being folded into its ultimate shape;

Fig. 2 is a top plan view of the completed assembly of Fig. 1; and

Figs. 3 and 4 are elevational views of a negative and a positive electrode plate, respectively, forming part of the assembly of Figs. 1 and 2.

The assembly 10, Figs. 1 and 2, comprises a separator member 11 consisting of at least one layer of a semipermeable or permeable sheet material, e. g. regenerated cellulose (cellophane). This member, whose width measured between edges 11′ and 11″ is more than twice the extent of an electrode plate 12 (Fig. 3) or 13 (Fig. 4) in its vertical dimension, is first accordion-pleated to form a series of pockets adapted to receive pairs of negative plates 12a, 12b alternating with pairs of positive plates 13a, 13b. As will be apparent from Figs. 1 and 2, the negative and the positive electrode plates have unwrapped edges which face in opposite directions and are thus exposed to direct irrigation by the electrolyte in a negative compartment 14 and in a positive compartment 15, respectively, into which the casing 16 (Fig. 1) is divided by the assembly 10. Negative conductors 17a, 17b extend laterally outward from plates 12a, 12b toward the compartment 14; positive conductors 18a, 18b similarly extend outward from plates 13a, 13b toward the compartment 15. It will be understood that these conductors are connected to respective battery terminals (not shown).

Before the assembly 10 is placed inside the casing 16, it is folded along its center line in the manner illustrated in Fig. 2, thereby causing the edges 11′ and 11″ to be positioned adjacent each other; at the same time the two innermost negative electrodes 12a, 12b are placed next to each other, so that at this point there exists a departure from the strict alternation of positive and negative plates. These innermost negative electrodes may, if desired, be made somewhat thinner than the others, as shown, so as to be the approximate equivalent of a single plate.

Although in Figs. 1 and 2 the electrode plates have been shown without any individual wrapping, it will be apparent that their irrigation by the electrolyte in compartments 14 and 15 would not be appreciably diminished by their envelopment in one or more layers of a highly porous material, such as the cellulosic paper described in U. S. Patent No. 2,610,219, issued September 9, 1952, to M. N. Yardeny (now Yardney) and owned by the assignee of this application. Thus, I have shown in Fig. 3 a negative electrode 12 consisting, for example, of a perforated zinc sheet of the type disclosed in my U. S. application Ser. No. 98,432, filed June 11, 1949 (now abandoned). The perforations 19 in sheet 12 accommodate a conductor 17, e. g. of copper or silver, which passes through these perforations and is additionally anchored to the plate 12 by a pressed-out lug 20. A porous or highly permeable wrapping 21 envelops the plate 12 and is provided with an aperture 22 near a corner of this plate through which passes the conductor 17; this arrangement is thus similar to the showing of, for example, Figs. 3 and 4 of my aforementioned abandoned application.

In Fig. 4 I have shown, by way of example, a positive plate 13 consisting of compacted silver powder into which, as disclosed in the aforesaid Yardney patent, a wire 18 (which may be of silver) formed into a figure-eight-shaped loop has been pressed. The projecting end of conductor 18 passes through an aperture 23 in a wrapper 24 which may be similar to the wrapping 21 of Fig. 3.

The invention is, of course, not limited to the specific arrangements described and illustrated but may be modified in various ways, both as to the structural relationship of the parts and the nature of the materials employed, without departing from the spirit and scope of the appended claims.

I claim:

1. An electrode assembly for electrolyte-liquor-containing electric batteries, comprising an accordion-pleated sheet of electrolyte-permeable sheet material folded along a horizontal line into the shape of a U with substantially alike upstanding arms, each arm of the U comprising a set of undulations forming a plurality of pockets in a series, sides of adjacent pockets in one arm of the U being open only in opposite directions, and electrodes of positive and negative polarities alternately received in said adjacent pockets.

2. An assembly according to claim 1, wherein the innermost pockets of both arms of the U face in the same direction.

3. An assembly according to claim 2, wherein the electrodes in said innermost pockets are of the same polarity.

4. An assembly according to claim 3, wherein the electrodes in said innermost pockets are thinner than the remaining ones of said electrodes.

5. An assembly according to claim 1, wherein all electrodes in pockets facing in one of said directions are of the same polarity.

6. A method of making an electrode assembly for electric batteries which comprises the steps of accordion-pleating a strip of electrolyte-permeable sheet material, folding the so pleated strip along a horizontal line into the shape of a U with substantially alike upstanding arms each forming a set of undulations defining pockets closed at their bottoms and alternately open at opposite sides of a vertical plane transverse to said median line, and inserting electrodes of opposite polarities into alternate ones of said pockets.

7. An electrode assembly as defined by claim 1 wherein one of the electrodes is of high solubility in the battery electrolyte liquor.

8. An electrode assembly as defined by claim 1 wherein the positive electrode contains silver and the negative electrode contains zinc.

9. An electrode assembly as defined by claim 8 wherein the separator sheet comprises a layer of regenerated cellulose.

References Cited in the file of this patent

UNITED STATES PATENTS

| | | |
|---|---|---|
| 2,157,629 | Rolph | May 9, 1939 |
| 2,594,709 | Andre | Apr. 29, 1952 |
| 2,610,219 | Yardeny | Sept. 9, 1952 |
| 2,701,271 | Mautner et al. | Feb. 1, 1955 |